United States Patent [19]

Staerk et al.

[11] Patent Number: 5,102,233
[45] Date of Patent: Apr. 7, 1992

[54] INDICATOR FOR MONITORING AND TEMPERATURE CONTROL OF FROZEN PRODUCTS

[75] Inventors: Ingeborg Staerk, Neuilly; Walter Holzer, Meersburg, both of Fed. Rep. of Germany

[73] Assignee: Provera GmbH, Meersburg, Fed. Rep. of Germany

[21] Appl. No.: 680,639

[22] Filed: Apr. 2, 1991

Related U.S. Application Data

[63] Continuation of Ser. No. 273,356, Nov. 18, 1988, abandoned.

[30] Foreign Application Priority Data

Nov. 20, 1987 [DE] Fed. Rep. of Germany ....... 3739266

[51] Int. Cl.$^5$ ............................................. G01K 11/06
[52] U.S. Cl. ..................................... 374/160; 116/217
[58] Field of Search ............................... 116/215-217, 116/219, 207; 374/106, 160; 426/88

[56] References Cited

U.S. PATENT DOCUMENTS

| | | | |
|---|---|---|---|
| 3,220,259 | 11/1965 | Beyer | 426/88 |
| 3,701,282 | 10/1972 | Peterson | 116/216 |
| 4,051,804 | 10/1977 | Garnett | 116/207 |

FOREIGN PATENT DOCUMENTS 1515293 3/1968 France ................. 374/160

Primary Examiner—William A. Cuchlinski, Jr.
Assistant Examiner—W. Morris Worth
Attorney, Agent, or Firm—Brown, Martin Haller & McClain

[57] ABSTRACT

A method for monitoring frozen products and an indicator for temperature monitoring of the frozen products using one or several liquids with various melting temperatures; the liquids are encapsuled in cavities of an indicator and are frozen in certain geometric patterns. During the melting process these liquids lose their frozen shape. The cavities are at least partially elastic-deformable, and the liquid is forced into certain geometric patterns by means of mechanic deformation of the walls. The deformation of the walls is accomplished by application of a stamp which has been cooled.

6 Claims, 2 Drawing Sheets

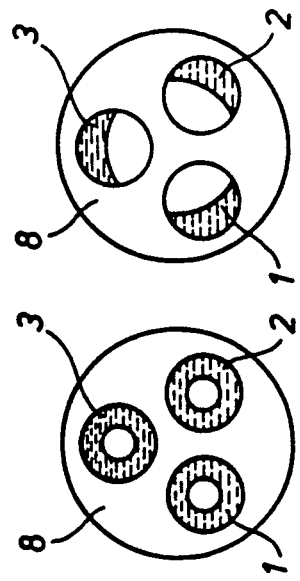
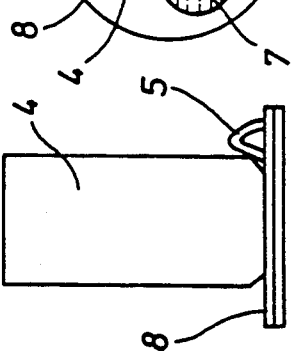
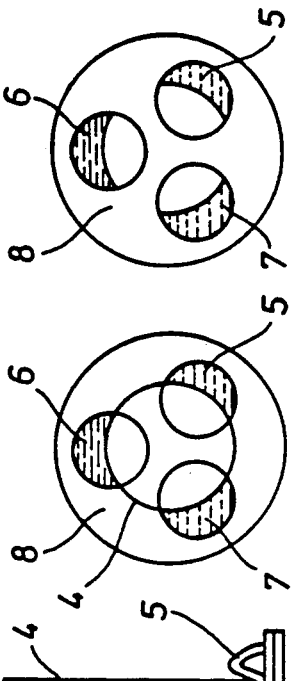
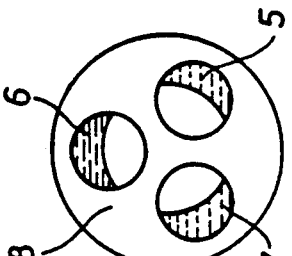
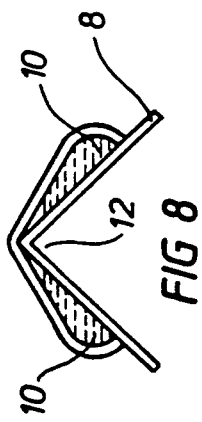
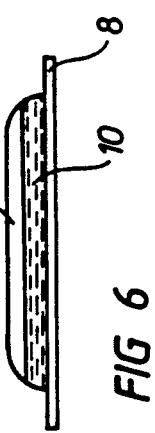
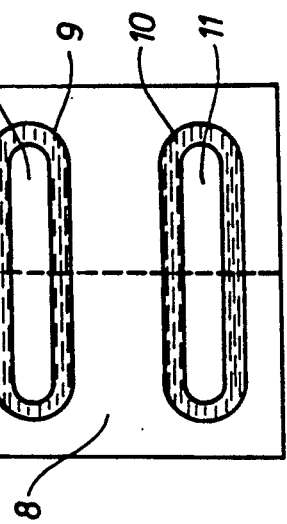
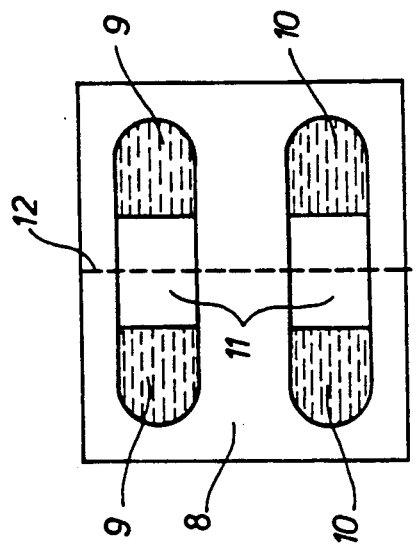
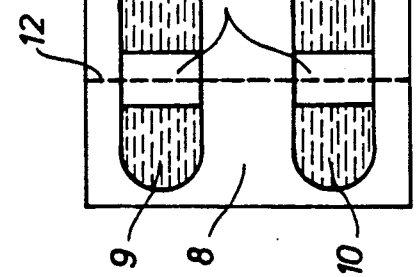

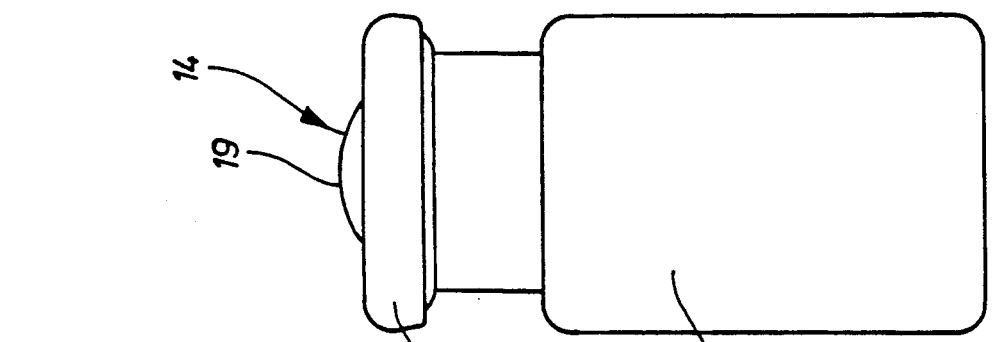
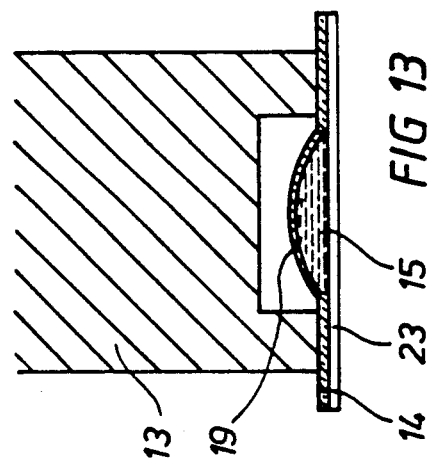
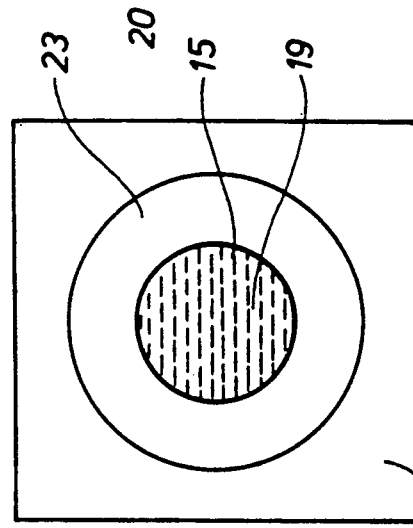
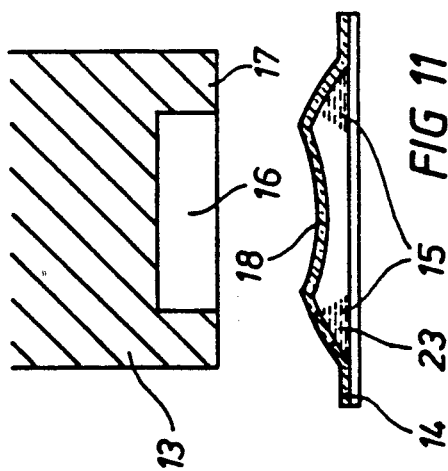
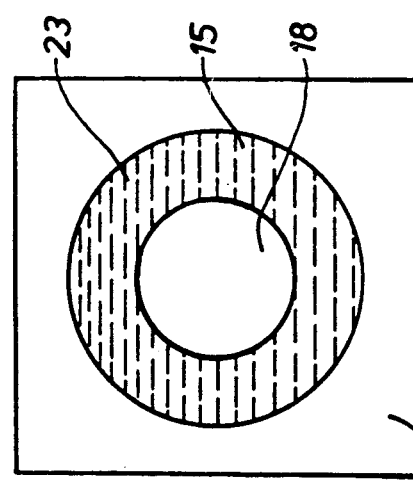

INDICATOR FOR MONITORING AND TEMPERATURE CONTROL OF FROZEN PRODUCTS

This is a continuation of application Ser. No. 07/273,356, filed Nov. 18, 1988, now abandoned.

BACKGROUND OF THE INVENTION

The objective of the invention is continuous temperature monitoring of refrigerated and—especially—frozen products, which are perishable—even during short-term defrosting.

Methods are known using an indicator, in which one or more liquids with varying melting points are encapsuled, for instance −18° C., −8° C and 0° C. (−0.4° F., 17.6° F. and 32° F. resp.). The indicator is being frozen prior to being added to the product to be monitored. In order to recognize possible melting of the liquids they are first brought into a certain geometric pattern which they lose in case melting occurs. A known method uses centrifugation of the indicator during the freezing process. Thus the liquid is being propelled into the outermost areas of the cavities where it is frozen. In case one of the melting temperatures is exceeded, the respective liquid starts to run and assumes a different shape. Even in case of renewed freezing the liquid never regains the original geometric pattern resulting from the centrifugation.

FIG. 1 and FIG. 2 indicate the functioning of such known procedure. FIG. 1 shows an indicator 8 with three "eyes" 1, 2 and 3 prior to centrifugation and freezing. FIG. 2 shows the identical indicator following centrifugation and freezing.

The objective of this invention is to avoid the complicated process of centrifugation.

SUMMARY OF THE INVENTION

As per the invention it is recommended to design the indicator at least partially with elastic deformable walls, allowing the liquid to be pressed into certain areas of the cavities and, thus, into certain geometric patterns by means of mechanic deformation from the outside.

The mechanic deformation of the elastic deformable walls can be accomplished in different ways.

In one of the first methods the mechanic deformation of the walls is achieved by applying a stamp which displaces the liquid into certain other areas of the cavity. The entire device consisting of indicator with applied stamp is brought into a cooling chamber or cooling bath, in order to freeze the liquid in the position as displaced by the stamp. Upon removal of the stamp the indicator is ready for use.

In a second version the stamp itself is cooled until the temperature is below that of the respective liquid in the indicator, thus freezing the liquid. Therefore, it is no longer necessary to place the indicator in a cooling chamber or cooling bath, since the stamp itself has been cooled.

Particular advantages are obtainable when the elastic deformable cavities are designed in such a way that the liquid is moved by capillary force when the indicator changes from its frozen state to the melting state. This eliminates any possibility of fraud, since renewed freezing of the indicator does not result in returning the liquid in the capillary crevices of the cavity to their orignial position.

BRIEF DESCRIPTION OF THE DRAWINGS

Various design versions of the invention are explained below—refer to the drawings mentioned:

FIG. 1 shows a prior art indicator in its melted condition

FIG. 2 shows the indicator of FIG. 1 in frozen condition;

FIG. 3 shows the application of the stamp to one embodiment of the indicator of FIGS. 4 and 5 in side view;

FIG. 4 is a top view of the indicator of this invention with the applied cooling stamp.

FIG. 5 shows the indicator of FIG. 4 with the cooling stamp removed in frozen position.

FIG. 6 shows a side view of an embodiment of the indicator of this invention in foldable form FIG. 7 shows the top view of the indicator of FIG. 6;

FIG. 8 shows the indicator of FIGS. 6 and 7 in folded condition;

FIG. 9 shows the indicator of FIGS. 6 and 7 in frozen condition;

FIG. 10 shows the indicator of FIGS. 6 and 7 in unfolded condition;

FIG. 11 shows the application of a cooling stamp to yet another embodiment of the indicator of this invention with capillary crevices in the cavity in defrosted contition;

FIG. 12 shows the indicator of FIG. 11 in defrosted condition;

FIG. 13 shows the cooling stamp and the indicator of FIG. 11 in frozen position.

FIG. 14 shows the indicator of FIG. 11 in frozen position and

FIG. 15 shows the indicator of FIG. 11 ready to be installed in the lid of a container.

DETAILED DESCRIPTION AND PREFERRED EMBODIMENTS.

FIGS. 3 and 4 show an example as per the invention of an indicator 8 of the same design as in FIG. 1, however, with a cooling stamp 4 applied, which has already been frozen to a much lower temperature than the freezing point of the liquid. The cooling stamp 4 squeezed and deformed the eye 5. Eyes 6 and 7 are also deformed. Due to the applied cold by means of cooling stamp 4 the liquids freeze and, following removal of the cooling stamp 4, the indicator 8 shows the same design pattern as that achieved by centrifugation with the method presently in use. FIG. 5 shows this condition. All other functions of the indicator are in accordance with the currently used method.

Another method as per the invention to being the liquids into certain geometric patterns by means of mechanic deformation consists of bending or folding the indicator in the area of the cavities.

FIGS. 6 and 7 show such a design example of an indicator in its unfolded condition. The cavities 9, 10 filled with indicator liquids also contain a little air 11 or another gas, which is—as shown in FIG. 9—compressed along the folding line 12 during the folding process and which, in turn, presses the indicator liquids into the remaining cavity volume.

In this condition (FIG. 8) the indicator liquid is frozen. In its frozen and flat condition the indicator looks approximately as shown in FIG. 10 and is added to the chilled goods in this condition.

It is obvious that the aforementioned process is not only simplified but more economic than the prior art processes, since no centrifuges or similar devices are required.

The two described embodiments are only exemplary since there is enormous design freedom regarding the shape of the indicator and the application possibilities of the invention, based on the various possible shapes of the cavities, the cooling stamps and the position of the folding edges.

In the design examples as per FIG. 11 thru 14 a stamp 13 is applied to an indicator 14. The stamp 13 shows a center recess 16 which is surrounded by a cooled rim area 17.

The indicator 14 consists of a base plate, for instance made of transparent plastic material, which is covered by an upper elastic deformable film, whereby a cavity is formed holding a liquid 15. In its defrosted condition the liquid 15—due to the capillary force—collects in the radially outwardly designed capillary crevices 23.

The top view as per FIG. 12 shows the indicator 14 shaped like an eye with the liquid 15 being stored in the radial outer ring area.

To bring the defrosted indicator as per FIGS. 11 and 12 into its freeze position and, thus, its monitoring position, the stamp 13 is applied to the indicator 14 as shown in FIG. 13. This results in the melted liquid 15, which was previously stored in the radial outer capillary crevices 23, being formed towards the center of the indicator 14's cavity, due to the fact that the rim area 17 of stamp 13 with its inner diameter is smaller than the diameter of the capillary crevices, so that the liquid 15 is displaced towards the center and out of these capillary crevices, as shown in FIG. 13.

The upper elastic deformable wall of the indicator is now forming a convex cover surface 19. This indicator is frozen in this position, so that the liquid 15 remains in the center of the indicator, and the indicator in its frozen or monitoring position assumes the appearance as shown in FIG. 14.

It is important that the upper cover of the indicator is elastic and deformable and that the thus formed cavity is only partially filled with the liquid, resulting in a concave cover surface 18 during a defrosted condition.

FIG. 15 shows the installation of indicator 14 in the cover 21 of a container 20. This arrangement eliminates any possibility of fraud. In case of an attempted falsification, for instance by applying an identical stamp to the cover 21 or container 20 as shown in FIG. 13, the rim area 17 of stamp 13 would pierce the cover, since the outer diameter of the cover 21 is much larger than the indicator 14 installed in the cover. Thus, renewed freezing of the indicator 14 cannot be accomplished, even in case a stamp as per FIGS. 11 and 13 is used.

We claim:

1. A device for monitoring the temperature exposure of a frozen article which is disposed in close proximity to said device for a period of time and which has been exposed to essentially the same temperature environment as said device during said period of time, said device comprising:

a base;

at least one elastically deformable film defining at least one cavity between said base and said film, said cavity having a first shape, at least one of said base and said film being transparent and thereby permitting visual observation of said cavity, said cavity having therein a quanitity of a single liquid, said liquid having a predetermined melting point;

said film being adapted to be mechanically deformed such that said cavity is deformed and assumes a second shape causing said liquid to assume a first position within the deformed cavity in which said liquid can be frozen, said first position being different from a second position within said cavity which is the position that said liquid assumes by capillary action in the cavity when thawed;

wherein the observed position of said liquid indicating whether the temperature of said liquid has reached at least said melting point of said liquid during said period of time from which observation the temperature exposure of said article in proximity to said device can be determined.

2. A device as in claim 1 wherein said at least one cavity has a capillary volume into which melted liquid is drawn upon melting of said frozen liquid and in which said melted liquid assumes said second position.

3. A device as in claim 1 wherein there are a plurality of cavities located in outer peripheral areas of said device.

4. A device as in claim 1 wherein said base and film are foldable and the deformation of said deformable cavity is accomplished by folding of said foldable base and film.

5. A device as in claim 1 in combination with a container for said frozen article, said device and said container being substantially abutting.

6. A device as in claim 5 in combination with a container for said frozen article, said device and said container being substantially abutting and joined together by attachment means which partially overlies said device and has a surface which presents a visual indication if any deforming force is applied to said device after said device containing said frozen liquid has been joined to said container by said attachment means.

* * * * *